Patented May 21, 1946

2,400,724

UNITED STATES PATENT OFFICE 2,400,724

PREPARATION OF POLYHYDROXY COMPOUNDS

Joseph Frederic Walker, Lewiston, N. Y., assignor to E. I. du Pont de Nemours & Company, Wilmington, Del., a corporation of Delaware No Drawing. Application October 28, 1942, Serial No. 463,685

10 Claims. (Cl. 260—635)

This invention relates to the preparation of polyhydroxy compounds, more particularly branched-chain polyhydroxy compounds, which comprise two or more methylol groups directly attached to a carbon atom free from hydrogen. More particularly, it relates to the preparation of polymethylol methanes, compounds of which pentaerythritol, pentaglycerol, and pentaglycol are typical, by reacting an aliphatic aldehyde such as acetaldehyde, propionaldehyde, or isobutyraldehyde with formaldehyde in the presence of an alkaline agent, and hydrogenating the reaction mixture containing the intermediate methylol aldol in the presence of a hydrogenation catalyst.

My invention is concerned with a general method for the preparation of polyhydroxy compounds of a type which may be characterized by the general formula:

$$CR_{3-n}(CH_2OH)_{n+1}$$

In this formula $n$ may be 1, 2 or 3. R designates a lower alkyl group having not over 4 carbon atoms.

These compounds are prepared by reacting an aliphatic aldehyde having from 2 to 10 carbon atoms and having at least one hydrogen atom on the carbon directly attached to the aldehyde group with formaldehyde in accordance with the following equation:

$$CH_nR_{3-n}CHO + nCH_2O = CR_{3-n}(CH_2OH)_nCHO$$

This intermediate methylol aldol compound is converted to the desired polyhydroxyl compound by hydrogenating the reaction mixture, the reaction proceeding as indicated by the following equation:

$$CR_{3-n}(CH_2OH)_nCHO + H_2 = CR_{3-n}(CH_2OH)_{n+1}$$

In all these equations $n$ may equal 1, 2, or 3, and R designates a lower alkyl group having not over 4 carbon atoms. Thus, an aldehyde such as acetaldehyde, propionaldehyde, isobutyraldehyde, isovaleric aldehyde, n-butyraldehyde, 2-methyl butyraldehyde or n-caprylaldehyde may be reacted with formaldehyde to produce products which may be designated as follows, (using the Geneva system of nomenclature):

The preparation of polyhydroxyl compounds of the type described by reacting formaldehyde with another aliphatic aldehyde (such as acetaldehyde, propionaldehyde or isobutyraldehyde) in the presence of an alkali or alkaline earth hydroxide or carbonate as the catalyst has previously been described in the chemical literature. This results in the formation of a methylol aldol, for example, trimethylol acetaldehyde (pentaerythrose)

$$(CH_2OH)_3C \cdot CHO$$

formed when one mole of acetaldehyde is reacted with three moles of formaldehyde.

In converting the methylol aldol to polyhydroxy compounds such as pentaerythritol, prior workers in the field have ordinarily reacted the methylol aldol with another mole of formaldehyde and with one mole of an alkali such as potassium or sodium hydroxide. In the preparation of polyhydroxy compounds in this way, taking the preparation of pentaerythritol as illustrative, this has resulted in a two-stage process wherein the reactions may be represented by the following equations:

$$CH_3CHO + 3CH_2O \rightarrow C(CH_2OH)_3CHO$$

$$C(CH_2OH)_3CHO + CH_2O + NaOH \rightarrow C(CH_2OH)_4 + NaOOCH$$

It might be noted that in the first stage alkali serves merely as reaction catalyst, whereas in the final stage it reacts stoichiometrically. While sodium hydroxide is indicated as the alkali, other alkalis are, of course, utilizable and have previously been utilized in this reaction. Thus, the hydroxides and carbonates of the alkali metals, and the oxides and hydroxides of the alkaline earth metals, may be utilized as the reaction catalyst, while the use of strong alkalis such as the hydroxides is preferred in the second stage. While these reactions actually occur in two distinct stages, ordinarily the complete process is carried out in a single step, the alkaline agent initially introduced serving both as catalyst in the first stage and as reactant in the second.

It is apparent that in the second stage of this process considerable quantities of formaldehyde are consumed solely as the reducing agent, and

| Aldehyde | Polymethylol methane |
|---|---|
| 1. Acetaldehyde, $CH_3CHO$ | 2,2-dimethylol-propandiol(1,3),(pentaerythritol), $C(CH_2OH)_4$. |
| 2. Propionaldehyde, $CH_3CH_2CHO$ | 2,2-dimethylol-propanol(1),(pentaglycerol), $CH_3.C(CH_2OH)_3$. |
| 3. Isobutyraldehyde, $(CH_3)_2CHCHO$ | 2,2-dimethyl-propandiol(1,3),(pentaglycol), $(CH_3)_2C(CH_2OH)_2$. |
| 4. Isovaleraldehyde, $(CH_3)_2CHCH_2CHO$ | 2-methyl-3,3-dimethylol-butanol(1), $(CH_3)_2CH.C(CH_2OH)_3$. |
| 5. n-Butyraldehyde, $CH_3CH_2CH_2CHO$ | 2,2-dimethylol-butanol(1), $C_2H_5.C(CH_2OH)_3$. |
| 6. 2-methylbutyraldehyde, $CH_3CH_2CH(CH_3)CHO$ | 2-methyl-2-methylol-butanol(1), $C_2H_5.C(CH_3)(CH_2OH)_2$. |
| 7. n-Caprylaldehyde, $CH_3(CH_2)_6CHO$ | 2,2-dimethylol-octanol(1), $C_6H_{13}C(CH_2OH)_3$. | the resulting polymethylol methane, such as pentaerythritol, must be isolated from a considerable quantity of alkali metal formate. Another disadvantage of the method now utilized is that the reaction, under ordinary conditions, will not proceed to completion and the product is contaminated with viscous non-crystallizable aldols.

To avoid these disadvantages I have now developed a process wherein the second stage of the above reaction, the conversion of the methylol aldol to the desired branched-chain polyhydroxy compound, is carried out in whole or in part by hydrogenating the product resulting from the first stage of the reaction. This involves carrying out the first stage of the reaction in the presence of an alkaline catalyst in order to secure the methylol aldol, and then catalytically hydrogenating this product to the desired pentaerythritol, pentaglycerol, pentaglycol, or other branched-chain polyhydroxy compound (polymethylol methane), by passing hydrogen into the reaction mixture in the presence of a hydrogenation catalyst. Any well-known hydrogenation catalyst will serve, but ordinarily I prefer to use a special form of nickel such as the Raney nickel catalyst (U. S. Patent 1,628,190), or finely divided platinum or palladium. Other catalytic nickel or cobalt catalysts can, of course, be employed. Hydrogenation can be effected at ordinary atmospheric pressure, but owing to the slowness of the rate of hydrogenation at atmospheric pressure I prefer to utilize hydrogen pressures in the neighborhood of 1000 to 2000 lbs. per sq. inch.

As examples of my process the following may be given:

*Example 1.—Preparation of pentaerythritol*

In a 1-liter flask fitted with a stirrer, thermometer, and dropping funnel, there were placed 358 g. of 37% formaldehyde, 104 g. of 95% paraformaldehyde (7.7 moles total $CH_2O$) and 60 g. of 40.5% NaOH. The slurry was cooled to 10° C. and 88 g. acetaldehyde (2 moles) was added with agitation in 45 min., keeping the temperature below 25° C. 108 g. of 40.5% NaOH (total of 1.7 moles NaOH) was then added gradually over a period of one hour, keeping the temperature below 25° C. After standing over night the reaction mixture was divided into two equal portions, one portion being worked up for pentaerythritol directly, and the other being subjected to hydrogenation.

To the portion not hydrogenated, there was added 100 cubic centimeters of a saturated solution of oxalic acid. The sodium oxalate was then filtered off, and the filtrate vacuum concentrated. The pentaerythritol was filtered off and washed with methanol. The yield was 97.3 g. pentaerythritol, or 71.5% on the basis of acetaldehyde used.

The other portion of the reaction product was placed in a steel bomb with 12 g. of Raney nickel catalyst and hydrogenated at 1500 to 2000 lbs. hydrogen pressure at room temperature. When the hydrogen absorption stopped the product was filtered, 100 cubic centimeters of saturated oxalic acid solution added, the sodium oxalate filtered off, and the filtrate vacuum concentrated. After crystalliaztion the pentaerythritol was filtered off and washed with methanol. The yield was 121 g., or 89% of theory based on the acetaldehyde used, a substantial increase over the yield obtained by the known method. The product was of better color than that isolated without hydrogenation and was more readily isolated, since viscous sugar-like products which interfere with crystallization were present only in small amount.

*Example 2.—Preparation of pentaglycerol*

In a 1-liter flask fitted with a stirrer, thermometer and dropping funnel, there were placed 116 g. (2 moles) of propionaldehyde, 325 g. of 37% formaldehyde solution (4 moles $CH_2O$), and 75 cubic centimeters of methanol. The solution was cooled to 10° C. and 50 cubic centimeters of 2 N potassium hydroxide solution (0.10 mole), was gradually added with agitation, keeping the temperature below 30° C.

After standing over night the reaction mixture was placed in a steel bomb with 20 g. Raney nickel catalyst and hydrogenated at room temperature under a hydrogen pressure of 1500 to 2000 lbs. per sq. inch. When hydrogen was no longer absorbed the reaction product was filtered off and vacuum concentrated to remove water. On cooling and filtering the concentrated product there was obtained 188 g. of pentaglycerol. This is equivalent to 78% of theory, based on propionaldehyde used.

*Example 3.—Preparation of pentaglycol*

In a 1-liter flask, equipped with a stirrer, thermometer, and dropping funnel, there were placed 144 g. (2 moles) of isobutyraldehyde and 178 g. of 37% formaldehyde solution (2.2 moles $CH_2O$). This solution was then cooled to 10° C. and 60 cc. of 2 N sodium hydroxide solution (0.12 mole) were added gradually, with agitation, keeping the temperature below 20° C.

After standing over night 18 g. of Raney nickel catalyst was added to the reaction mixture, which was then placed in a steel bomb and hydrogenated at room temperature with continuous shaking under a pressure of 1500 to 2000 lbs. per sq. inch. When hydrogen was no longer absorbed, the reaction mixture was filtered and vacuum concentrated to remove water. The product was then purified by crystallization from hot trichloroethylene. The pure pentaglycol weighed 181 g. This amount is equivalent to 87% of the theoretical yield, based on the isobutyraldehyde used.

While in the foregoing examples I have used acetaldehyde, propionaldehyde, and isobutyraldehyde as illustrative, of course formaldehyde may be reacted with any other aliphatic aldehyde having the general formula $CH_nR_{3-n}CHO$, where $n$ equals 1, 2, or 3, and R is a lower alkyl group having not over 4 carbon atoms. These aliphatic aldehydes may be generically characterized as those containing from 2 to 10 carbon atoms and having at least one hydrogen atom on the carbon directly attached to the aldehyde group.

By hydrogenating the reaction product a branched-chain polyhydroxy compound comprising one or more methylol groups directly attached to a carbon atom free from hydrogen is produced, (a polymethylol methane), the compounds having the general formula $CR_{3-n}(CH_2OH)_{n+1}$. R and $n$ have the same significance as in the general formula used above in defining the aliphatic aldehyde which is reacted with formaldehyde.

It should be understood that various changes from the above procedures given as illustrative of certain preferred embodiments of my invention may be made, without departing from the ambit of my invention. Accordingly, its scope is to be construed in accordance with the appended claims.

I claim:

1. The process for preparing a branched-chain polyhydroxy compound wherein methylol groups are directly attached to a carbon atom not containing hydrogen which comprises reacting formaldehyde and a saturated aliphatic aldehyde containing from 2 to 10 carbon atoms and having at least one hydrogen atom attached to the carbon directly attached to the aldehyde group, said reaction being carried out in the presence of a basic catalyst, and passing hydrogen into the reaction mixture in the presence of a hydrogenation catalyst.

2. The process for preparing a polymethylol methane containing from 2 to 4 methylol groups and in which methane the carbon valencies not satisfied by methylol groups are satisfied by lower alkyl groups containing not over 4 carbon atoms which comprises reacting formaldehyde and a saturated aliphatic aldehyde containing from 2 to 10 carbon atoms and having at least one hydrogen atom attached to the carbon directly attached to the aldehyde group, said reaction being carried out in the presence of a basic catalyst, and passing hydrogen into the reaction mixture in the presence of a hydrogenation catalyst.

3. The process for preparing a branched-chain polyhydroxy compound of the general type $CR_{3-n}(CH_2OH)_{n+1}$ which comprises reacting a saturated aliphatic aldehyde containing from 2 to 10 carbon atoms and having at least one hydrogen atom attached to the carbon directly attached to the aldehyde group with formaldehyde, said reaction being carried out in the presence of an alkaline agent, and passing hydrogen into the reaction mixture in the presence of a hydrogenation catalyst; $n$ in said general formula being 1, 2, or 3, and R designating a lower alkyl group having not over 4 carbon atoms.

4. The process for preparing pentaerythritol which comprises reacting formaldehyde and acetaldehyde in the presence of an alkaline agent, and passing hydrogen into the reaction mixture in the presence of a hydrogenation catalyst in order to convert intermediate product to the desired pentaerythritol.

5. The process for preparing pentaglycerol which comprises reacting formaldehyde and propionaldehyde in the presence of an alkaline agent, and passing hydrogen into the reaction mixture in the presence of a hydrogenation catalyst in order to convert intermediate product to the desired pentaglycerol.

6. The process for preparing pentaglycol which comprises reacting formaldehyde and isobutyraldehyde in the presence of an alkaline agent, and passing hydrogen into the reaction mixture in the presence of a hydrogenation catalyst in order to convert intermediate product to the desired pentaglycol.

7. The process for preparing pentaerythritol which comprises reacting formaldehyde and acetaldehyde in the presence of sodium hydroxide, and passing hydrogen into the reaction mixture in the presence of a hydrogenation catalyst in order to convert any intermediate product formed therein to the desired pentaerythritol.

8. The process for preparing pentaglycerol which comprises reacting formaldehyde and propionaldehyde in the presence of sodium hydroxide, and passing hydrogen into the reaction mixture in the presence of a hydrogenation catalyst in order to convert intermediate product to the desired pentaglycerol.

9. The process for preparing pentaglycol which comprises reacting formaldehyde and isobutyraldehyde in the presence of sodium hydroxide, and passing hydrogen into the reaction mixture in the presence of a hydrogenation catalyst in order to convert intermediate product to the desired pentaglycol.

10. The process for preparing a polymethylol methane containing from 2 to 4 methylol groups and in which methane the carbon valencies not satisfied by methylol groups are satisfied by alkyl groups, which comprises reacting formaldehyde and a saturated aliphatic aldehyde containing from 2 to 10 carbon atoms and having at least one hydrogen atom attached to the carbon directly attached to the aldehyde group, said reaction being carried out in the presence of caustic soda, and passing hydrogen into the reaction mixture in the presence of a hydrogenation catalyst.

JOSEPH FREDERIC WALKER.